United States Patent
Xia et al.

(10) Patent No.: US 11,222,118 B2
(45) Date of Patent: Jan. 11, 2022

(54) METHOD FOR UPDATING SELINUX SECURITY POLICY AND TERMINAL

(71) Applicant: Huawei Technologies Co., Ltd., Shenzhen (CN)

(72) Inventors: Dengzhou Xia, Beijing (CN); Fuzhou Xiao, Beijing (CN); Li Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 16/758,619

(22) PCT Filed: Oct. 30, 2017

(86) PCT No.: PCT/CN2017/108436
§ 371 (c)(1),
(2) Date: Apr. 23, 2020

(87) PCT Pub. No.: WO2019/084737
PCT Pub. Date: May 9, 2019

(65) Prior Publication Data
US 2020/0380133 A1    Dec. 3, 2020

(51) Int. Cl.
*H04L 9/00* (2006.01)
*G06F 21/57* (2013.01)

(52) U.S. Cl.
CPC ........ *G06F 21/57* (2013.01); *G06F 2221/034* (2013.01)

(58) Field of Classification Search
CPC .... G06F 21/57; G06F 2221/034; G06F 21/53; G06F 21/604; H04L 63/20
See application file for complete search history.

(56) References Cited

U.S. PATENT DOCUMENTS

| | | | | |
|---|---|---|---|---|
| 8,595,810 | B1 * | 11/2013 | Ben Ayed | ........... H04L 63/0815 |
| | | | | 726/8 |
| 2009/0158385 | A1 * | 6/2009 | Kim | .................... G06F 21/6218 |
| | | | | 726/1 |

(Continued)

FOREIGN PATENT DOCUMENTS

| CN | 104572212 A | 4/2015 |
|---|---|---|
| CN | 106453413 A | 2/2017 |

(Continued)

OTHER PUBLICATIONS

Wu, P., "Design and Implementation of Securiting Privilege Escalation on Android Platform," Beijing University of Posts and Telecommunications, Issue 04, 2015, 68 pages (with English Abstract).

*Primary Examiner* — Beemnet W Dada
(74) *Attorney, Agent, or Firm* — Slater Matsil, LLP (57) ABSTRACT

A method for updating a SELinux security policy and a terminal. The method includes receiving, by the terminal, a security policy file sent by a server. The method further includes, performing, by the terminal in a power-on status, storing the security policy file in preset storage space by using a first service or process, modifying, by the terminal, a value of a preset attribute value from a first value to a second value by using the first service or process, reading, when it is detected that the value of the preset attribute value is changed from the first value to the second value, the security policy file from the preset storage space by using a second service or process and writing the security policy file into a memory, and loading, by the terminal, the security policy file in the memory by using the second service or process.

14 Claims, 8 Drawing Sheets

(56) References Cited

U.S. PATENT DOCUMENTS

| | | | |
|---|---|---|---|
| 2010/0250908 A1* | 9/2010 | Amann | G06F 8/656 |
| | | | 713/1 |
| 2012/0216242 A1 | 8/2012 | Uner et al. | |
| 2015/0186203 A1 | 7/2015 | Goyal et al. | |
| 2017/0118249 A1* | 4/2017 | Motukuru | H04L 63/08 |
| 2017/0185389 A1* | 6/2017 | Ge | G06F 8/65 |
| 2017/0351862 A1* | 12/2017 | Mohinder | G06F 21/57 |
| 2018/0217783 A1* | 8/2018 | Hildstrom | G06F 3/0643 |
| 2021/0194528 A1* | 6/2021 | Zalewski | H04W 76/14 |

FOREIGN PATENT DOCUMENTS

| | | |
|---|---|---|
| CN | 106650480 A | 5/2017 |
| CN | 106775903 A | 5/2017 |
| GN | 104112089 A | 10/2014 |
| GN | 105718268 A | 6/2016 |
| GN | 106878239 A | 6/2017 |
| WO | 2016192774 A1 | 12/2016 |

* cited by examiner

METHOD FOR UPDATING SELINUX SECURITY POLICY AND TERMINAL

CROSS REFERENCE TO RELATED APPLICATIONS

This application is a National Stage of International Application No. PCT/CN2017/108436, filed Oct. 30, 2017, which is hereby incorporated by reference in its entirety.

TECHNICAL FIELD

This application relates to the field of operating system technologies, and in particular, to a method for updating a Security-Enhanced Linux® (SELinux) security policy and a terminal.

BACKGROUND

With popularization of intelligent terminals such as a smartphone, security of the intelligent terminals is increasingly important. Application of a SELinux technology in an existing operating system platform greatly improves security of the operating system. For example, the SELinux technology is applied to an Android™ system. In the SELinux technology, a security policy file is formulated, and access permissions for access of different processes to system resources are specified in the security policy file, so that the different processes have different access permissions. This ensures that in the process, not only a basic function of the process can be performed but also malicious use of the system resources can be prevented. Based on a premise that each process function is ensured, an access permission of the process is minimized, to ensure maximum system security. A permission of a process beyond a regular service brings a safety risk to the entire system. To modify the access permission of the process, only the security policy file can be modified and updated to a terminal. An existing update manner is as follows: The security policy file is modified, a system upgrade patch package is recompiled and generated, and the generated system upgrade patch package is pushed to the intelligent terminal in an over-the-air (OTA) programming manner. Then, the intelligent terminal upgrades the system by using the system upgrade patch package, to update the security file. When the security policy file is updated by upgrading the system, the intelligent terminal needs to be restarted. This may interrupt the current service. When the system upgrade patch package is relatively large, a repair time is relatively long.

SUMMARY OF THE INVENTION

This application discloses a method for updating a SELinux security policy and a terminal, so as to resolve a prior-art problem that a current service is interrupted because a terminal is restarted when a security policy file is updated in a system upgrade manner and that a repair time is relatively long when a system upgrade patch package is relatively large.

According to a first aspect, a method for updating a SELinux security policy applied to a terminal is provided. The method includes: receiving, by the terminal, a security policy file sent by a server, and after the receiving the security policy file, performing, by the terminal in a power-on status, the following steps: storing the security policy file in preset storage space, reading the security policy file from the preset storage space and writing the security policy file into a memory, and loading the security policy file in the memory.

The foregoing method provided in this embodiment of this application can update the security policy file formulated by using a SELinux technology. In the update manner provided in this embodiment of this application, the terminal does not need to be restarted, and a service currently running on the terminal is not interrupted. In addition, after receiving the security policy file sent by the server, the terminal may automatically run the update method provided in this embodiment of this application in the background. In addition, because only the security policy file is updated and a process of refreshing a partition is omitted, an update speed of the security update process is large. Therefore, the updated security policy file can come into effect immediately and quickly.

In a possible design, before the reading, by the terminal, the security policy file from the preset storage space and writing the security policy file into the memory, the method further includes: performing, by the terminal, security and/or integrity check on the security policy file stored in the preset storage space.

In a possible design, the storing, by the terminal, the security policy file in preset storage space includes: storing, by the terminal, the security policy file in the preset storage space by using a first service or process, where the reading, by the terminal, the security policy file from the preset storage space and writing the security policy file into a memory includes: modifying, by the terminal, a value of a preset attribute value from a first value to a second value by using the first service or process, and when it is detected that the value of the preset attribute value is changed from the first value to the second value, reading, by the terminal, the security policy file from the preset storage space by using a second service or process and writing the security policy file into the memory, where the loading, by the terminal, the security policy file in the memory includes: loading, by the terminal, the security policy file in the memory by using the second service or process.

In a possible design of the first aspect, when the terminal is powered off, the value of the preset attribute value is changed from the second value to the first value, and when the terminal is restarted, the method further includes: in a kernel startup stage, modifying, by the terminal, the value of the preset attribute value from the first value to the second value, to read the security policy file from the preset storage space and write the security policy file into the memory after it is detected, in the second service or process, that the value of the preset attribute value is modified from the first value to the second value.

In a possible design of the first aspect, the first service or process is an update_sepolicy service, the second service or process is an init process, and the preset attribute value is an attribute value of a SELinux.reload_policy.

In a possible design in the first aspect, the storing, by the terminal, the security policy file in preset storage space, reading the security policy file from the preset storage space and writing the security policy file into a memory, and loading the security policy file in the memory includes: storing, by the terminal, the security policy file in the preset storage space by using a preset service or process, reading the security policy file from the preset storage space and writing the security policy file into a memory, and loading the security policy file in the memory.

In a possible design of the first aspect, the preset service or process is an init process.

In a possible design of the first aspect, the preset storage space is a preset writable partition of the terminal.

According to a second aspect, a terminal is provided. The terminal includes: a receiving unit, configured to receive a security policy file sent by a server, a processing unit, configured to write the security policy file into a first storage unit while the terminal is in a power-on status, wherein the processing unit is further configured to read the security policy file from the first storage unit and write the security policy file into a second storage unit, where the second storage unit is a memory, and the processing unit is further configured to load the security policy file in the second storage unit.

In a possible design of the second aspect, the processing unit is further configured to perform security and/or integrity check on the security policy file stored in the first storage unit.

In a possible design of the second aspect, the processing unit is further configured to: store the security policy file in the first storage unit by using a first service or process, modify a value of a preset attribute value from a first value to a second value by using the first service or process, and when it is detected that the value of the preset attribute value is changed from the first value to the second value, read the security policy file from the first storage unit by using a second service or process and write the security policy file into the second storage unit, and load the security policy file in the second storage unit by using the second service or process.

In a possible design of the second aspect, when the terminal is powered off, the value of the preset attribute value is changed from the second value to the first value, and when the terminal is restarted, the processing unit is further configured to: in a kernel startup stage, modify the value of the preset attribute value from the first value to the second value, to read the security policy file from the first storage unit and write the security policy file into the second storage unit after it is detected, in the second service or process, that the value of the preset attribute value is modified from the first value to the second value.

In a possible design of the first aspect, the first service or process is an update_sepolicy service, the second service or process is an init process, and the preset attribute value is an attribute value of a SELinux.reload_policy.

In a possible design of the second aspect, the processing unit is further configured to: store the security policy file in the first storage unit by using a preset service or process, read the security policy file from the first storage unit and write the security policy file into the second storage unit, and load the security policy file in the second storage unit.

In a possible design of the second aspect, the preset service or process is an init process.

In a possible design of the second aspect, the first storage unit is a preset writable partition of the terminal.

According to a third aspect, a terminal is provided. The terminal includes: a communications interface, a processor, a memory, and a bus, where the memory includes a first memory and a second memory, and the second memory is a memory, the memory stores program code, and when the program code is executed by the processor, the terminal is enabled to perform the following steps: the communications interface is configured to receive a security policy file sent by a server, and the processor is configured to write the security policy file into the first memory while the terminal is in a power-on status, read the security policy file from the first memory and write the security policy file into the second memory, and load the security policy file in the second memory.

In a possible design of the third aspect, the processor is further configured to perform security and/or integrity check on the security policy file stored in the first memory.

In a possible design of the third aspect, the processor is further configured to: store the security policy file in the first memory by using a first service or process, modify a value of a preset attribute value from a first value to a second value by using the first service or process, and when it is detected that the value of the preset attribute value is changed from the first value to the second value, read the security policy file from the first memory by using a second service or process and write the security policy file into the second memory, and load the security policy file in the second memory by using the second service or process.

In a possible design of the third aspect, when the terminal is powered off, the value of the preset attribute value is changed from the second value to the first value, and when the terminal is restarted, the processor is further configured to: in a kernel startup stage, modify the value of the preset attribute value from the first value to the second value, to read the security policy file from the first memory and write the security policy file into the second memory after it is detected, in the second service or process, that the value of the preset attribute value is modified from the first value to the second value.

In a possible design of the third aspect, the first service or process is an update_sepolicy service, the second service or process is an init process, and the preset attribute value is an attribute value of a SELinux.reload_policy.

In a possible design of the third aspect, the processor is further configured to: store the security policy file in the first memory by using a preset service or process, read the security policy file from the first memory and write the security policy file into the second memory, and load the security policy file in the second memory.

In a possible design of the third aspect, the preset service or process is an init process.

In a possible design of the third aspect, the first memory is a preset writable partition of the terminal.

According to a fourth aspect, a computer readable storage medium is provided. The computer readable storage medium stores an instruction, and when the instruction is run on a terminal, the terminal is enabled to perform the method for updating a SELinux security policy according to the first aspect.

According to a fifth aspect, a computer program product including an instruction is provided. When the computer program product is run on a terminal, the terminal is enabled to perform the method for updating a SELinux security policy according to the first aspect.

DETAILED DESCRIPTION OF ILLUSTRATIVE EMBODIMENTS

In a SELinux technology, a plurality of permission policies are formulated, so that an access subject has only a minimum access permission to an access object, thereby improving system security. The access subject mainly refers to various processes, threads, and the like in the terminal. The access object mainly refers to various system resources in the terminal that are used for communication, information sharing, and storage, such as a file, a socket (socket), storage space, a directory, and a shared memory. A mobile phone is used as an example, system resources in the mobile phone include a system file stored in the mobile phone, storage space of the mobile phone, storage directories of different storage space, and the like.

The permission policy defined in the SELinux can be expressed in the following format: rule_name source_type target_type: object_class perm_set.

The rule_name is used to represent a type of the permission policy, and the type may be "allow" or "forbid". The source_type represents an access subject, and is usually a name of a process or a thread, the target_type: object_class represents an access object, and the perm_set represents an operation that can be performed by the access subject on the access object (when the rule_name is the "allow") or an operation that is forbidden to be performed by the access subject on the access object (when the rule_name is the "forbid"). The object_class may be file, and represent a common file, or may be dir, and represent a directory, or may be fd, and represent a file descriptor. When the object_class is the file, the perm_set may represent a plurality of operations such as "read", "write", and "create".

For example, a permission policy is: allow netd proc:file write. The allow represents that the rule is an "allow rule", the netd represents that the access subject is an netd process, the proc:file represents that the access object is a common file in a proc directory, and the write represents that an executable operation performed on the proc:file and defined by the rule is "write". Therefore, this permission policy means allowing the netd process to access the common file in a proc resource and to perform a write operation on the common file.

The SELinux has three optional modes in specific application: (1) A disabled (disabled) mode: A disabled mode represents that the SELinux is completely invalid. (2) A permissive mode: A permissive mode represents that only a log is recorded and an access behavior is not forbidden when a policy is violated. (3) An enforcing (enforcing) mode: An enforcing mode represents that a log is recorded and an access behavior is forbidden when a policy is violated. Currently, the SELinux may come into effect completely in an Android L version and later versions, and the enforcing mode is enabled by default. In this mode, when an application program violates the permission policy, the resource cannot be obtained, thereby causing some functions to be abnormal or invalid. When the SELinux technology is applied to an Android platform, the SELinux technology may also be referred to as SEAndroid.

When an access permission of the application program is excessively large or excessively small, the foregoing permission policy formulated by the SELinux needs to be modified. For example, an access permission set for an application process A is allowing the application process A to access or modify a system resource 1, but an actual service of the application process A does not need to access the system resource 1. In this case, if the application process A has vulnerability, the foregoing permission granted to the application process A may cause system resource 1 to be tampered with. As a result, there may be security vulnerability in the terminal. In the foregoing application scenario, the terminal needs to modify the permission policy formulated by the SELinux, for example, modify an access permission of the application process A to the system resource 1. Currently, when a terminal such as a mobile phone is delivered from a factory, a security policy file and another file are used to generate an image file, and the image file is written into a specific read-only partition. When the security policy file needs to be modified, a system is usually upgraded (in other words, a partition used to store the security policy file is updated) in an OTA upgrade manner to update the security policy file. The OTA upgrade refers to a technology in which a terminal downloads an upgrade package on a remote server by using a wireless network to upgrade a system or an application, and is a common software upgrade manner of a current Android system.

Figure 1A:
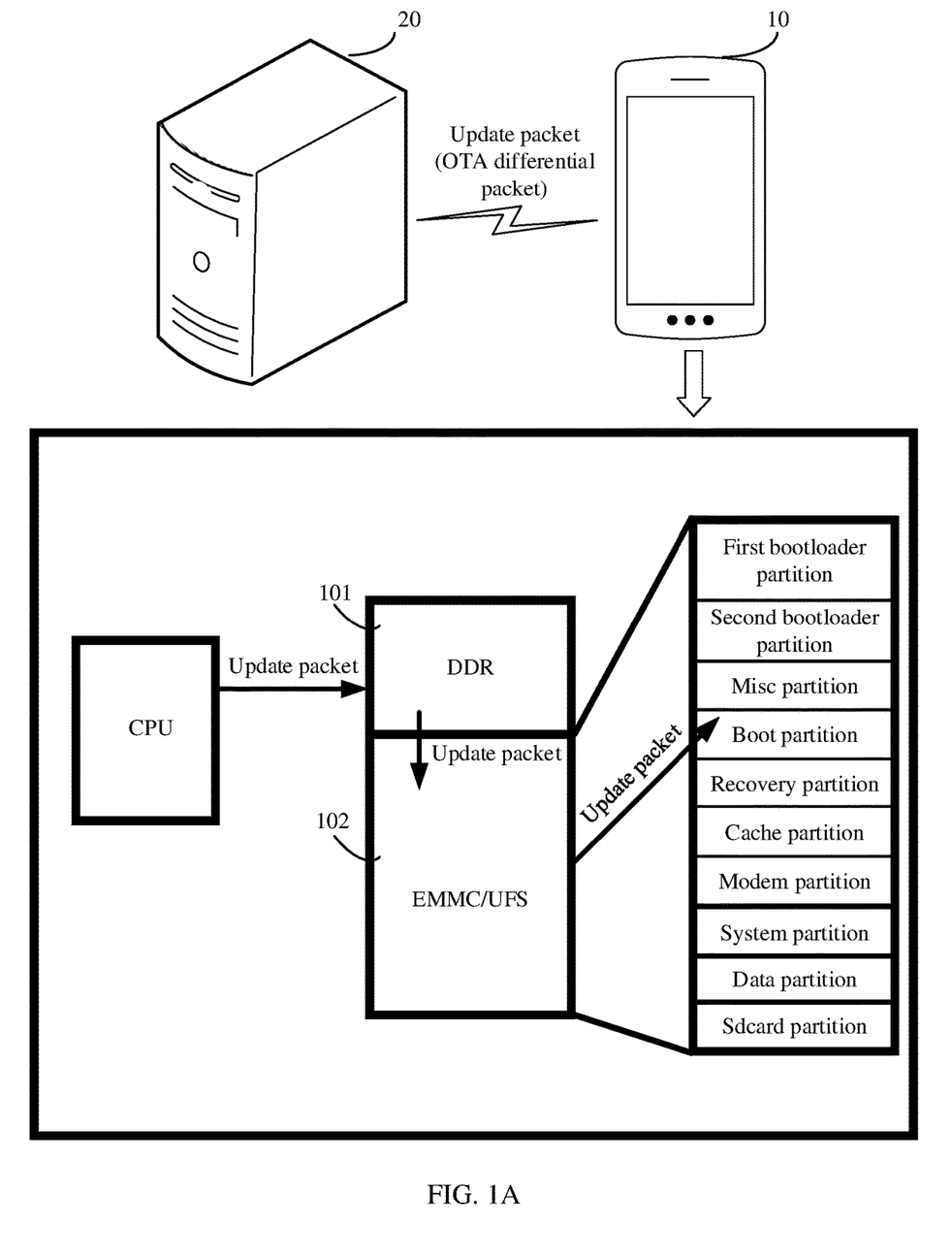
FIG. 1A is a schematic flowchart of a method for updating a SELinux security policy in the prior art.

Referring to FIG. 1A, a storage area of a mobile phone 10 includes two parts: a double data rate synchronous dynamic random access memory (Double Data Rate, DDR) 101 and an embedded multimedia card (EMMC)/universal flash memory (UFS) 102. The DDR 101 is equivalent to a "memory" of the mobile phone, and the EMMC/UFS 102 is equivalent to a "hard disk" of the mobile phone. For example, FIG. 1A shows a division of the EMMC/UFS 102, including a first bootloader partition, a second bootloader partition, a misc partition, a boot partition, a recovery partition, a cache partition, a modem partition, a system partition, a data partition, an sdcard partition, and the like.

The first bootloader partition, the second bootloader partition, and the boot partition store an application program related to startup of the mobile phone, and are used for the startup of the mobile phone. Specifically, the first bootloader partition mainly performs hardware detection, and after determining that the hardware can work normally, copies a file in the second bootloader partition to the DDR to perform a startup operation. In the second bootloader partition, hardware is initialized, a memory size is obtained, and the like. Then, code included in the boot partition continues to be executed. The cache partition is usually used to store a temporary cache generated by a mobile phone system. The misc partition is used to store a temporary file in a flag type. Usually, a piece of system software with a restoration function is written into the recovery partition. The system software can rewrite or clear the existing system. The modem partition is used to store files related to a baseband, for example, a file related to long term evolution (LTE) communication performed by the mobile phone. The system partition is used to store a system file. The partition is read-only by default. In other words, the system file stored in the system partition cannot be modified. Generally, the data partition is used to store user data, for example, data of various Android packages (APK). The sdcard partition is used to mount a secure digital memory card (SD). When the mobile phone is powered on, data stored in the EMMC/UFS 102 is loaded to the DDR 101.

It should be noted that the foregoing partition division is merely division used as an example. In actual application, there may be another partition form, and more or fewer partitions may be included.

In addition, in FIG. 1A, an example in which storage space of the mobile phone includes the DDR and the EMMC/UFS is used for description. In another implementation, the storage space of the mobile phone may further include: a static random access memory (SRAM) storage area, a Nand/Nor Flash storage area, a synchronous dynamic random access memory (SDRAM) storage area, and peripheral address space. The SRAM storage area is equivalent to a "memory" of the mobile phone, the Nand/Nor Flash storage area is a "hard disk" of the mobile phone, the Nand/Nor Flash stores all system data of the mobile phone, and the Nand/Nor Flash may be divided into the foregoing partitions.

For example, a partition storing the security policy file is a boot partition. Referring to FIG. 1A, a current OTA upgrade manner is specifically as follows: A server 20 recompiles and produces an upgrade package. The upgrade package is, for example, an OTA differential package, and then the server 20 sends the upgrade package to the mobile phone 10. After receiving the upgrade package, the mobile phone 10 first downloads the upgrade package to a local computer (which may be understood as writing the upgrade package into storage space of the mobile phone, for example, writing the upgrade package into a writable partition, which is usually a DATA partition for Android), and then refreshes the upgrade packet from the writable partition into the boot partition after a user agrees to upgrade, and a process of refreshing the boot partition is performed based on a premise that the mobile phone 10 needs to be restarted and system software stored in the recovery partition is started to enter a recovery mode (also called an upgrade mode). An operating mode of the mobile phone 10 includes a normal mode and a recovery mode. The recovery mode is a mode different from a normal power-on mode of the mobile phone 10. The mobile phone 10 needs to be restarted to enter the recovery mode. After the boot partition is refreshed, content in the boot partition is loaded to the memory only when the mobile phone 10 is powered on. Therefore, the mobile phone needs to be restarted again to reload the content in the refreshed boot partition, so that an updated security policy file comes into effect.

Figure 1B:
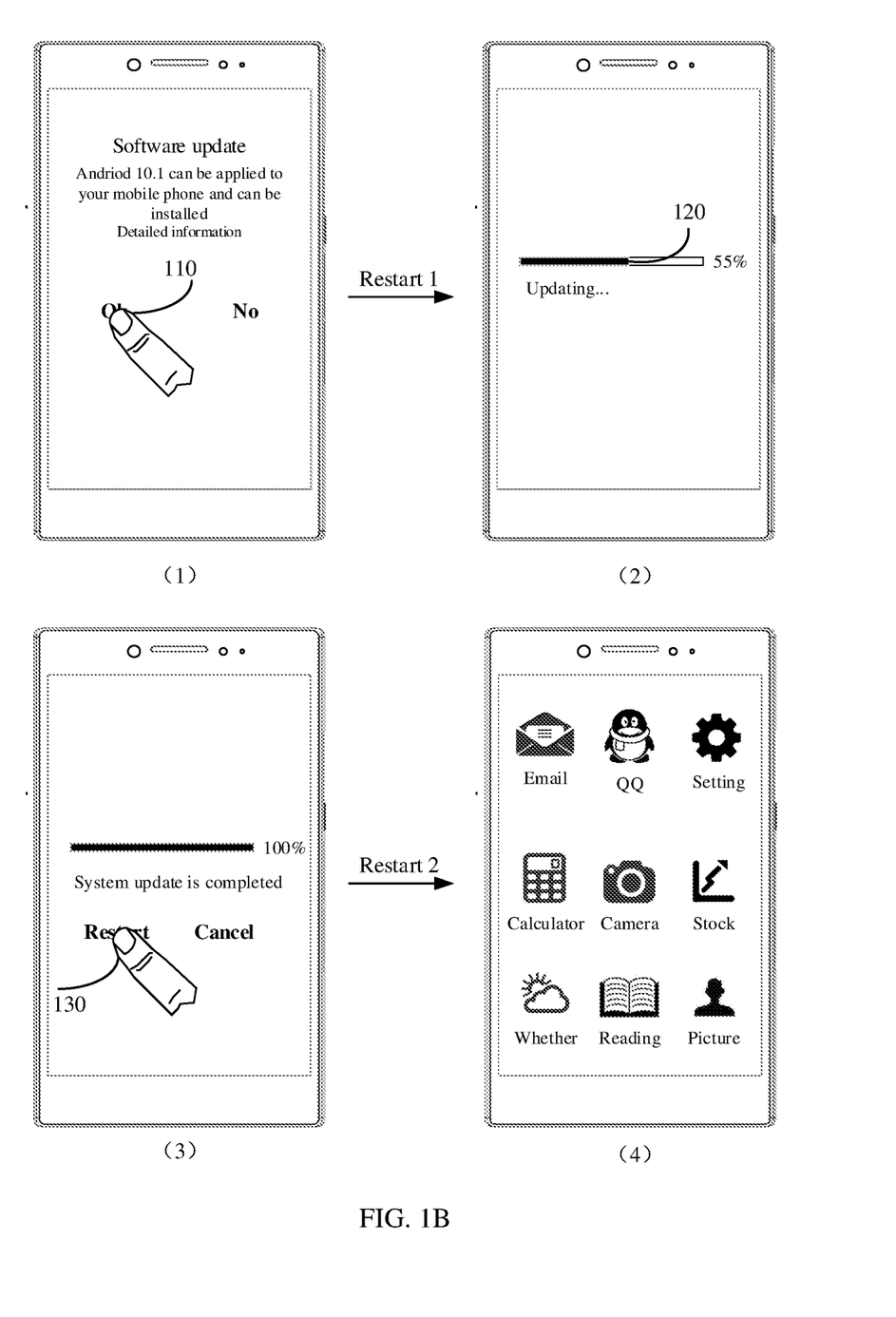
FIG. 1B is a schematic interface diagram of applying the method shown in FIG. 1A to a terminal.

Referring to FIG. 1B, from a perspective visible to a user, an upgrade process after the mobile phone 10 receives the updated upgrade package includes: The mobile phone displays a screen (1), and the screen (1) displays a prompt message prompting the user to upgrade. When the mobile phone detects an operation no performed by the user to confirm the upgrade, the mobile phone is restarted to enter the recovery mode, the mobile phone displays a screen (2), and the screen (2) displays a progress indicator. For example, an upgrade progress is expressed by using a progress bar 120. This process is essentially a process of refreshing the boot partition. After the upgrade is completed, the mobile phone displays a screen (3), and the screen (3) displays a prompt message prompting that the upgrade is completed and prompting the user to restart the mobile phone. When detecting a restart operation 130 performed by the user, the mobile phone is restarted again to load the refreshed boot partition, and displays a startup screen shown in a screen (4).

It can be seen that when the security policy file is updated in the current OTA update manner, the mobile phone needs to be restarted twice. This manner may interrupt the current service. When a system upgrade patch package is relatively large, a repair time is relatively long and even a risk that the mobile phone fails to be started if the upgrade fails may occur.

To resolve the foregoing problem, an embodiment of this application provides a method for updating a SELinux security policy. The method may be applied to any terminal that has an operating system to which a SELinux technology is applied, such as a mobile phone, a wearable device, an augmented reality (AR)\virtual reality (VR) device, a tablet computer, a personal digital assistant (PDA), or an in-vehicle terminal. Certainly, in the following embodiment, a specific form of the terminal is not limited.

Figure 2:
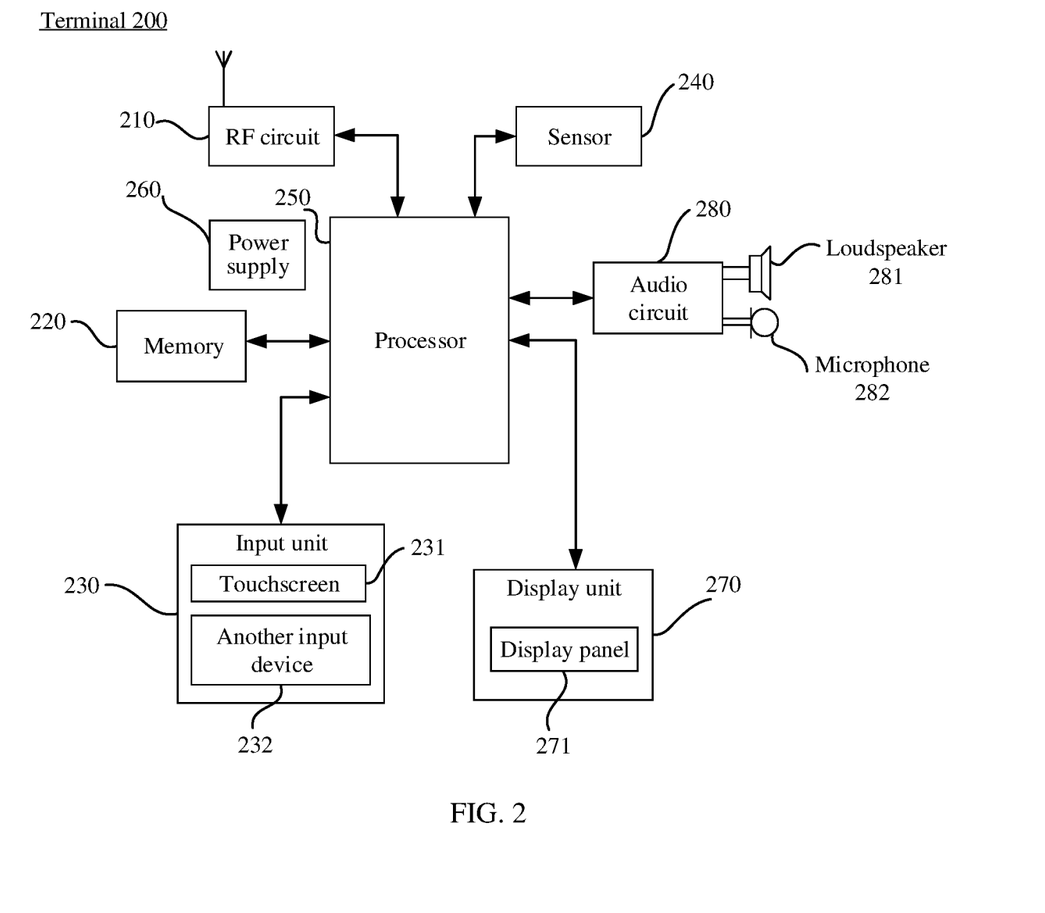
FIG. 2 is a schematic structural diagram of a mobile phone.

For example, the terminal is a mobile phone. As shown in FIG. 2, the terminal 200 includes: components such as a communications interface 210, a memory 220, an input unit 230, one or more sensors 240, a processor 250, a power supply 260, a display unit 270, and an audio circuit 280. It may be understood by a person skilled in the art that, the terminal structure shown in FIG. 2 does not constitute any limitation on the terminal, and the terminal may include more or fewer components than those shown in the figure, or combine some components, or have different component arrangements.

The following describes the functional components of the terminal 200.

The communications interface 210 is configured for the terminal 200 to communicate with another device. The communications interface 210 may be specifically implemented as a radio frequency (RF) circuit, and is configured to receive and send a signal in an information receiving and sending process or a call process. In particular, after receiving downlink information of a base station, the communications interface 210 sends the downlink information to the processor 250 for processing. In addition, the communications interface 210 sends uplink data to the base station. Generally, the RF circuit includes but is not limited to an antenna, at least one amplifier, a transceiver, a coupler, a low noise amplifier (LNA), a duplexer, or the like. In addition, the RF circuit may further communicate with a network and another device through wireless communication. The wireless communication may use any communications standard or protocol, including but not limited to global system for mobile communications (GSM), a general packet radio service (GPRS), code division multiple access (CDMA), wideband code division multiple access (WCDMA), long term evolution (LTE), an email, a short message service (SMS), and the like.

The memory 220 may be configured to store a software program and module. The processor 250 executes various functional applications and data processing of the terminal 200 by running the software program and module stored in the memory 220. The memory 220 may mainly include a program storage area and a data storage area. The program storage area may store an operating system, and an application program (APP) required by at least one function such as a sound play function or an image play function. The data storage area may store data (such as audio data, image data, or an address book) created based on use of the terminal 200, and the like. Certainly, the memory may further include a first memory and a second memory. The first memory is an "external memory" of the terminal, for example, the EMMC/UFS shown in FIG. 1A, and the second memory is an "internal memory" of the memory, for example, the DDR shown in FIG. 1A. In addition, the memory 220 may include a high-speed random access memory, and may further include a non-volatile memory, such as at least one magnetic disk storage device, a flash memory, or another volatile solid-state storage device.

The input unit 230 may be configured to receive digit or character information input by a user, and generate a key signal input related to a user setting and function control of the terminal 200. Specifically, the input unit 230 may include a touchscreen 231 and another input device 232. The touchscreen 231 is also referred to as a touch panel, and may collect a touch operation performed by a user on or near the touchscreen 231 (for example, an operation performed by the user on or near the touchscreen 231 by using any proper object or accessory such as a finger or a stylus), and drive a corresponding connection apparatus by using a preset program. Optionally, the touchscreen 231 may include two parts: a touch detection apparatus and a touch controller. The touch detection apparatus detects a touch direction of the user, detects a signal brought by a touch operation, and transmits the signal to the touch controller. The touch controller receives touch information from the touch detection apparatus, converts the touch information into touch coordinates, and sends the touch coordinates to the processor 250. In addition, the touch controller can receive and execute a command sent by the processor 250. In addition, the touchscreen 231 may be implemented by using a plurality of types such as resistive, capacitive, infrared, and surface acoustic wave. In addition to the touchscreen 231, the input unit 230 may further include the another input device 232. Specifically, the another input device 232 may include but is not limited to one or more of a physical keyboard, a function key (such as a volume control key or a power on/off key), a trackball, a mouse, a joystick, or the like.

The sensors 240 include sensors configured to recognize biological features, such as a fingerprint recognition sensor, a facial recognition sensor, and an iris recognition sensor. The fingerprint recognition sensor is used as an example. The fingerprint recognition sensor can collect fingerprint information of a user and report the collected fingerprint information to the processor 250, and the processor 250 performs identity recognition on the user based on the fingerprint information.

The sensors 240 further include a gravity sensor, which may detect a value of acceleration of the mobile phone in each direction (generally tri-axis), may detect a value and a direction of gravity when the mobile phone is motionless, and may be used in a posture recognition application of the mobile phone (for example, switching between landscape orientation and portrait orientation, a related game, or magnetometer posture calibration), a function related to vibration recognition (for example, a pedometer or a stroke), or the like.

The terminal 200 may further include another sensor, for example, a light sensor. Specifically, the light sensors may include an ambient light sensor and an optical proximity sensor. The ambient light sensor may adjust luminance of the display panel 231 based on brightness of ambient light. The optical proximity sensor may detect whether an object approaches or touches the mobile phone, and may turn off the display panel 231 and/or be backlight when the terminal 200 moves to an ear. Other sensors such as a gyroscope, a barometer, a hygrometer, a thermometer, and an infrared sensor may also be configured for the terminal 200. Details are not described herein.

The display unit 270 may be configured to display information input by the user or information provided for the user and various menus of the terminal 200. The display unit 270 may include a display panel 271. Optionally, the display panel 271 may be configured in a form of a liquid crystal display (LCD), an organic light-emitting diode (OLED), or the like. Further, the touchscreen 231 may cover the display panel 271. After detecting a touch operation performed on or near the touchscreen 231, the touchscreen 231 transmits the touch operation to the processor 250 to determine a type of the touch event, and then the processor 250 provides corresponding visual output on the display panel 271 based on the type of the touch event. Although in FIG. 2, the touchscreen 231 and the display panel 271 are used as two independent parts to implement input and output functions of the terminal 200, in some embodiments, the touchscreen 231 and the display panel 271 may be integrated to implement the input and output functions of the terminal 200.

The audio circuit 280, the loudspeaker 281, and the microphone 282 may provide an audio interface between the user and the terminal 200. The audio circuit 280 may convert received audio data into an electrical signal and transmit the electrical signal to the loudspeaker 281, and the loudspeaker 281 converts the electrical signal into a sound signal for output. In addition, the microphone 282 converts a collected sound signal into an electrical signal, and the audio circuit 280 receives the electrical signal, converts the electrical signal into audio data, and then outputs the audio data to the RF circuit 210, to send the audio data to, for example, another mobile phone, or outputs the audio data to the memory 220 for further processing.

The processor 250 is a control center of the terminal 200. The processor 250 is connected to all parts of the entire mobile phone by using various interfaces and lines, and executes various functions and data processing of the terminal 200 by running or executing the software program and/or module stored in the memory 220 and invoking data stored in the memory 220, thereby performing overall monitoring on the mobile phone. Optionally, the processor 250 may include one or more processing units. Optionally, the processor 250 may integrate an application processor and a modem processor. The application processor mainly processes the operating system, a user interface, an application program, or the like. The modem processor mainly processes wireless communication. It may be understood that, alternatively, the modem processor may not be integrated into the processor 250.

The terminal 200 further includes the power supply 260 (such as a battery) supplying power to each component. Optionally, the power supply may be logically connected to the processor 250 by using a power management system, so that functions such as charge and discharge management and power consumption management are implemented by using the power management system.

Although not shown, the terminal 200 may further include an antenna, a wireless-fidelity (Wi-Fi) module, a near field communication (NFC) module, a Bluetooth module, a loudspeaker, an accelerometer, a gyroscope, and the like.

All the following methods provided in the embodiments of this application may be applied to various terminals, including a mobile phone, shown in FIG. 2.

Figure 3:
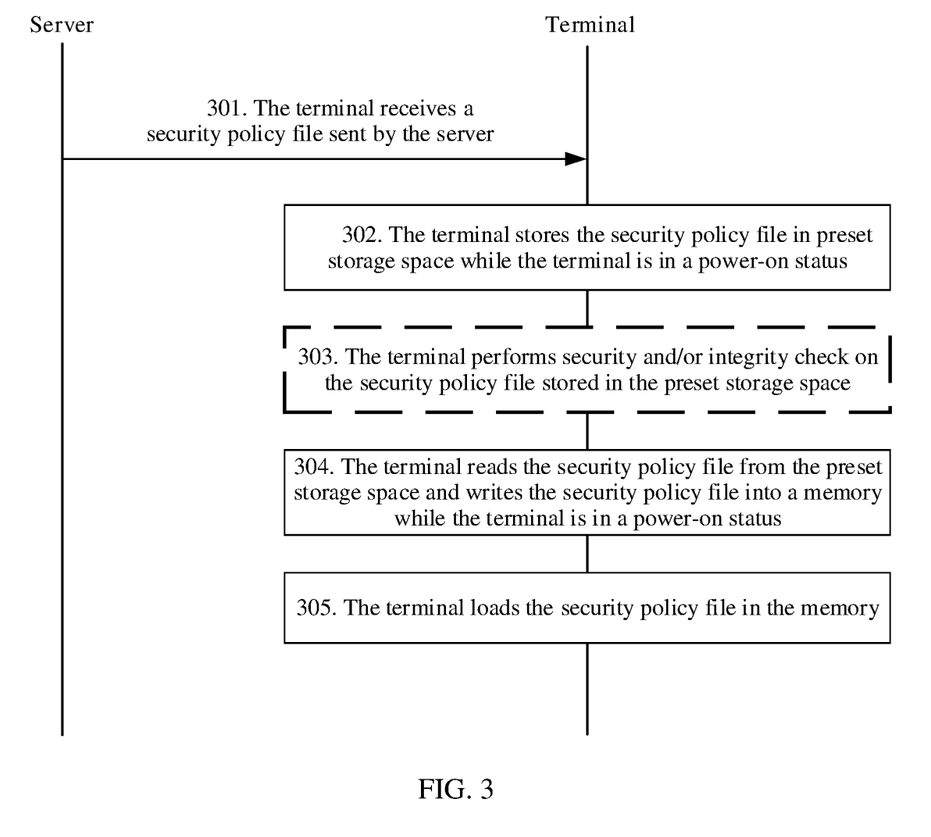
FIG. 3 is a schematic flowchart of a method for updating a SELinux security policy according to an embodiment of this application.

Referring to FIG. 3A, an embodiment of this application provides a method for updating a SELinux security policy. The method includes the following steps:

301. A terminal receives a security policy file sent by a server.

The security policy file is a common file. It can be seen that compared with the prior art in which the server pushes an image file including the security policy file to the terminal, the server needs to push only the security policy file to the terminal in this embodiment of this application. Upgrade packets such as an OTA differential package do not need to be generated on a server side.

302. The terminal stores the security policy file in preset storage space while the terminal is in a power-on status.

The preset storage space is storage space in the terminal rather than a memory.

Optionally, a writable partition of the terminal may be, for example, a data partition in FIG. 1A.

This process may be considered as a process in which the terminal downloads the security policy file.

303. The terminal performs validity and integrity check on the security policy file stored in the preset storage space.

In an implementation, the server generates a digital signature to encrypt the security policy file, and pushes the encrypted security policy file to the terminal. The terminal verifies the digital signature of the security policy file to implement the security and/or integrity check. For specific implementation of performing the security and/or integrity check on the file, refer to the prior alt Details are not described herein.

It should be noted that step 303 is an optional step, and the terminal may directly perform the following step 304 after performing step 302:

304. The terminal reads the security policy file from the preset storage space and writes the security policy file into a memory.

The memory is storage space for temporarily storing data in the terminal, in other words, storage space for caching data in the terminal, for example, the DDR 101 in FIG. 1A, and may also be a synchronous dynamic random access memory (SDRAM), or the like.

305. The terminal loads the security policy file in the memory.

It should be noted that when supporting the method for updating the SELinux security policy shown in step 301 to step 305 provided in this embodiment of this application, the terminal may still be compatible with an existing method for updating a security policy file in an OTA upgrade manner. In actual application, the method provided in this embodiment of this application is mainly applied to a scenario in which a security policy file formulated by using a SELinux technology is updated. A method updated in an OTA update manner may be used for all types of updates, and is a general update method.

The foregoing method provided in this embodiment of this application can update the security policy file formulated by using a SELinux technology. In the update manner provided in this embodiment of this application, the terminal does not need to be restarted, and a service currently running on the terminal is not interrupted. In addition, after receiving the security policy file sent by the server, the terminal may automatically run the update method provided in this embodiment of this application in the background. In addition, because only the security policy file is updated and a process of refreshing a partition is omitted, an update speed of the security update process is large. Therefore, the updated security policy file can come into effect immediately and quickly.

Figure 4A:
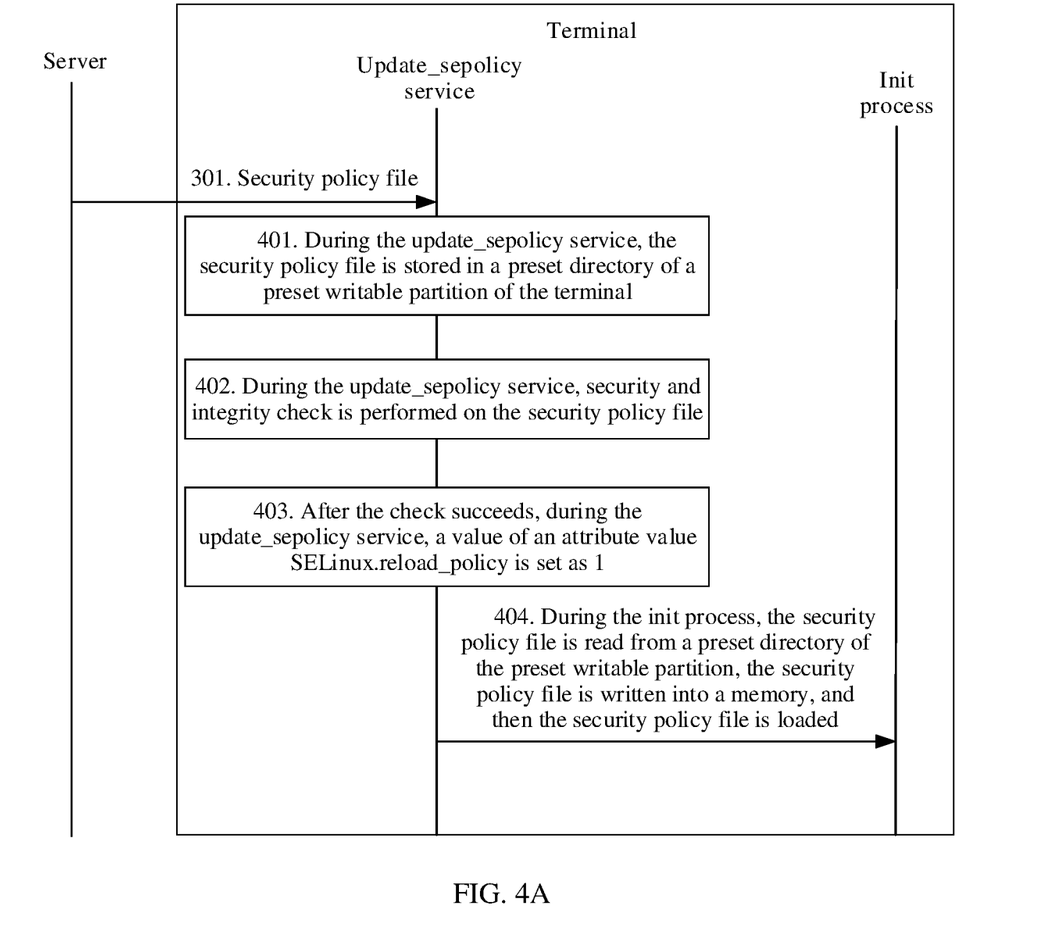
FIG. 4A is a schematic flowchart of still another method for updating a SELinux security policy according to an embodiment of this application.

Referring to FIG. 4A, in an implementation, the foregoing step 302 to step 305 may be completed through interaction of a specific service or process of the terminal. One process or service is used to download an updated security policy file, and the other process or service is used to load a downloaded security policy file. For example, an update_sepolicy service may interact with an init process for completing.

That the update_sepolicy service interacts with the init process to complete a specific implementation of the foregoing process includes the following steps:

401. During the update_sepolicy service, the security policy file is stored in a preset directory of a preset writable partition of the terminal.

For example, the preset writable partition is a data partition, and the preset directory may be a directory in the data partition such as/data/security/sepolicy.bin.

Step 401 may be considered as a process of downloading the security policy file during the update_sepolicy service.

402. During the update_sepolicy service, security and integrity check is performed on the security policy file.

The update_sepolicy service is a newly created service in this embodiment of this application, and is used to download a to-be-updated security policy file from a remote server, and perform the integrity check.

Certainly, to support the update_sepolicy service in performing step 402, the update_sepolicy service needs to have a read/write permission on a directory of storing the security policy file. For example, if the security policy file is stored in a /data/security/sepolicy.bin directory, the update_sepolicy service needs to have a read/write permission on a file under the directory.

Therefore, a premise on the update_sepolicy service in this embodiment of this application is set as follows: A write permission on the/data/security/directory has been configured for the service before delivery.

For specific implementation of performing the security and integrity check on the security policy file, refer to the prior art. Details are not described herein.

After the check succeeds, the following step 403 is performed:

403. During the update_sepolicy service, a value of an attribute value SELinux.reload_policy is set as 1.

Such attribute value as the SELinux.reload_policy is used to trigger an init process to reload the security policy file. An initial value of this attribute value is 0. After the security policy file passes the security check performed during the update_sepolicy service, the attribute value may be set to 1. When the attribute value being set to 1 is monitored during the init process, during the init process, reloading of the security policy file is tried. For details, refer to step 404.

Optionally, the update_sepolicy service may further set another self-defined attribute value. When a value of the attribute value is a preset value, the init process is also triggered to perform the following step 404:

404. During the init process, the security policy file is read from the preset directory of the preset writable partition, the security policy file is written into a memory, and then the security policy file is loaded.

Optionally, when step 404 is performed, during the init process, security and integrity check may be performed on the security policy file again, and the security policy file is loaded after the check succeeds.

The init process is an existing process and a first user-mode process in the system, and is used to load another subsequent system process. For specific implementation, refer to the prior alt Details are not described herein.

Certainly, to support the init process in performing step 404, improvement of the init process in this embodiment of this application is as follows: A path of the loading policy file of the init process is modified to a path specified in this embodiment of this application for storing the security policy file, for example, /data/security/sepolicy.bin.

It can be seen that in the implementation shown in FIG. 4A, the security policy file is downloaded during the update_sepolicy service and security and integrity check of the security policy file are performed during the update_sepolicy service. During the init process, the security policy file is loaded and secondary check may be performed on the file.

In consideration that after the terminal is restarted, the security policy file in the image file (for example, the boot partition) in the read-only partition is loaded by default during the startup based on the existing process, when the mobile phone is powered on again, after a kernel starts an init.rc script, an attribute value of the SELinux.reload_policy needs to be set to 1 in a post-fs-dat phase. In this way, the init process is triggered to reread the security policy file in the preset directory in the preset writable partition to load the security policy file, so as to cover the security policy file read from the boot partition.

Figure 4B:
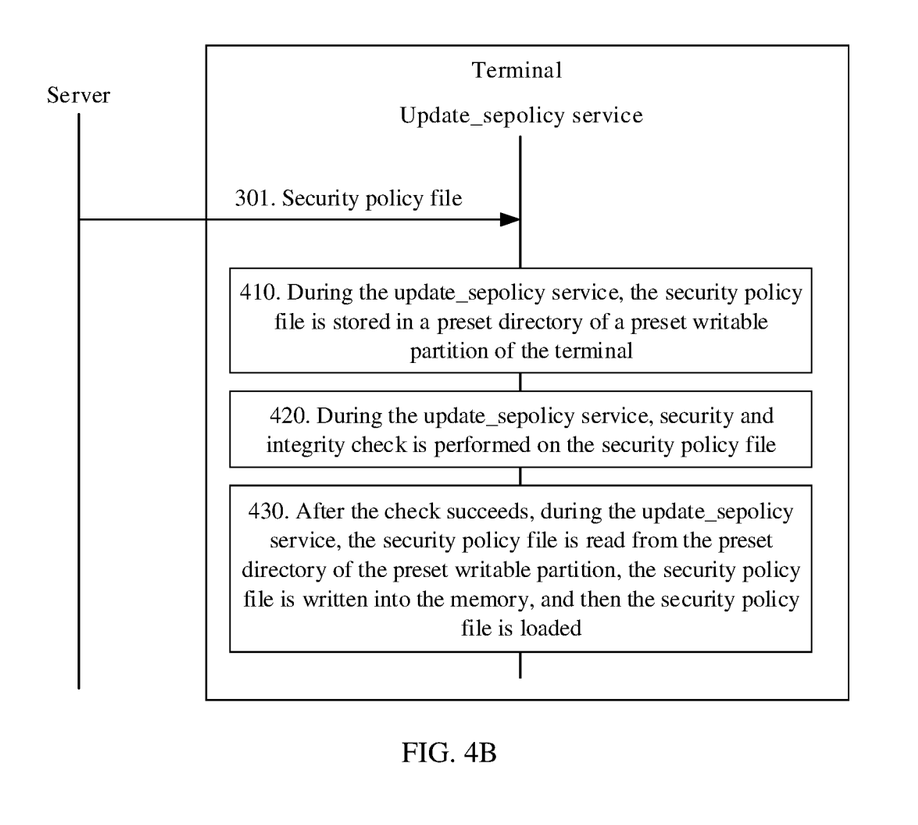
FIG. 4B is a schematic flowchart of yet another method for updating a SELinux security policy according to an embodiment of this application.

Referring to FIG. 4B, in another implementation, the foregoing step 302 to step 305 may be completed by a specific service or process of the terminal, for example, an update_sepolicy service.

That the update_sepolicy service completes the specific implementation of the process shown in step 302 to step 305 includes the following steps:

410. During the update_sepolicy service, the security policy file is stored in a preset directory of a preset writable partition of the terminal.

420. During the update_sepolicy service, security and integrity check is performed on the security policy file.

For specific implementation of step 410 and step 42o, refer to the foregoing step 401 and step 402. Details are not described herein.

After the check succeeds, the update_sepolicy service performs the following step 430:

430. After the check succeeds, during the update_sepolicy service, the security policy file is read from the preset directory of the preset writable partition, the security policy file is written into a memory, and then the security policy file is loaded.

In the implementation shown in FIG. 4B, the security policy file is downloaded during the update_sepolicy service, the security and integrity check is performed during the update_sepolicy service, and the downloaded security policy file is loaded during the update_sepolicy service. Therefore, an attribute value of the SELinux.reload_policy does not need to be set.

In consideration that the image file in the read-only partition is loaded when the terminal is restarted, and the image file also includes the security policy file, to perform the method shown in FIG. 4B, a policy of loading the security policy file during startup is modified, to directly read and load the security policy file in the preset writable partition specific to the update_sepolicy service.

Figure 5:
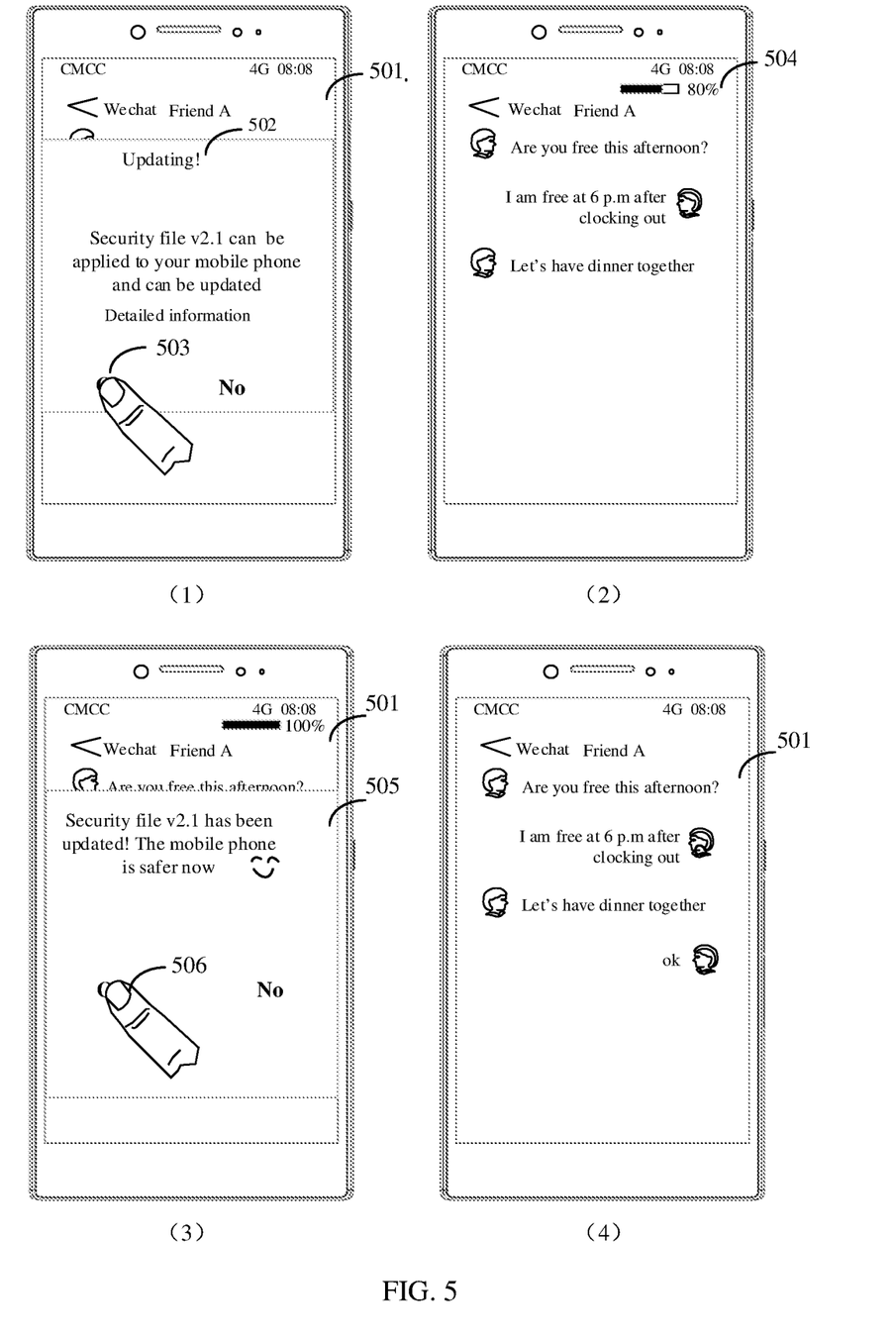
FIG. 5 is a schematic interface diagram of applying the method in FIG. 3, FIG. 4A, or FIG. 4B to a terminal.

In addition, in an implementation, the foregoing method provided in this embodiment of this application automatically runs in a background without being perceived by a user. In another implementation, referring to FIG. 5, as shown in the screen (1), in a process in which a user chats by using a "WeChat" application, after an updated security policy file sent by a server is received, a prompt dialog box 502 is displayed on a WeChat screen 501 in a floating manner, and a message prompting a user that a security file in the mobile phone can be updated is displayed on the screen 502. When the mobile phone detects an operation 503 performed by the user to determine an update, the method provided in this embodiment of this application is performed by the mobile phone background to update the security policy file. The mobile phone displays a screen (2), and displays, at an upper right corner of the screen (2), an update progress of the security file by using a progress bar 504 that is zoomed out. After the update is completed, as shown in a screen (3), a prompt dialog box 505 is displayed on the WeChat screen 501, to prompt the user that the security policy file is updated. Certainly, the user may also be prompted, in manners such as ringing, vibration, voice, or the like, that the update is completed. When a determining operation 506 performed by the user is detected, the mobile phone also displays only the WeChat screen 501.

It may be understood that, to implement the foregoing functions, the terminal in this application includes a corresponding hardware structure and/or software module for executing each function. A person skilled in the art may be very easily aware that, in combination with the examples described in the embodiments disclosed in the embodiments of this application, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal may be divided into function modules based on the foregoing method examples. For example, each function module may be obtained through division based on each function, or two or more functions may be integrated into one processing module. The integrated module may be implemented in a form of hardware, or may be implemented in a form of a software function module. It should be noted that, in the embodiments of this application, module division is an example, and is merely a logical function division. During actual implementation, another division manner may be used.

Figure 6:
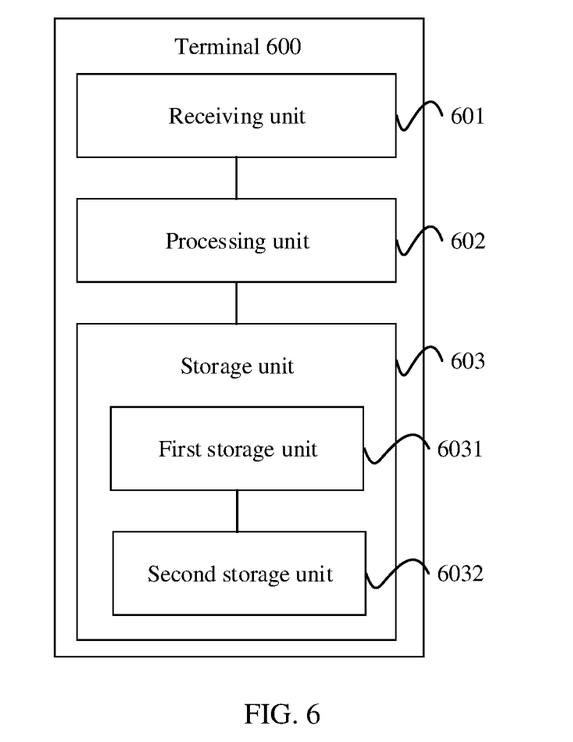
FIG. 6 is a schematic structural diagram of a terminal according to an embodiment of this application.

Referring to FIG. 6, a terminal 600 disclosed in an embodiment of this application includes: a receiving unit 601, a processing unit 602, and a storage unit 603, where the storage unit 603 specifically further includes a first storage unit 6031 and a second storage unit 6032.

The receiving unit 601 is configured to receive a security policy file sent by a server. The processing unit 602 is configured to write the security policy file 6031 into a first storage unit while the terminal is in a power-on status. The processing unit 602 is further configured to read the security policy file from the first storage unit 6031 and write the security policy file into a second storage unit 6032. The processing unit 602 is further configured to load the security policy file in the second storage unit 6032.

Optionally, the processing unit 602 is further configured to perform security and/or integrity check on the security policy file stored in the first storage unit 6031.

Optionally, the processing unit 602 is further configured to: store the security policy file in the first storage unit 6031 by using a first service or process, modify a value of a preset attribute value from a first value to a second value by using the first service or process, and when it is detected that the value of the preset attribute value is changed from the first value to the second value, read the security policy file from the first storage unit 6031 by using a second service or process and write the security policy file into the second storage unit 6032, and load the security policy file in the second storage unit 6032 by using the second service or process.

Optionally, when the terminal is powered off, the value of the preset attribute value is changed from the second value to the first value, and when the terminal is restarted, the processing unit 602 is further configured to: in a kernel startup stage, modify the value of the preset attribute value from the first value to the second value, to read the security policy file from the first storage unit 6031 and write the security policy file into the second storage unit 6032 after it is detected, in the second service or process, that the value of the preset attribute value is modified from the first value to the second value.

Optionally, the first service or process is an update_se-policy service, the second service or process is an init process, and the preset attribute value is an attribute value of a SELinux.reload_policy.

Optionally, the processing unit 602 is further configured to: store the security policy file in the first storage unit 6031 by using a preset service or process, read the security policy file from the first storage unit 6031 and write the security policy file into the second storage unit 6032, and load the security policy file in the second storage unit 6032.

Optionally, the preset service or process is an init process. The first storage unit 6031 is a preset writable partition of the terminal.

The receiving unit 601 may be implemented by a communications interface 210 of the terminal 200 shown in FIG. 2. The processing unit 602 may be implemented by a processor 250 of the terminal 200 shown in FIG. 2. The storage unit 603 may be implemented by a memory 220 of the terminal 200 shown in FIG. 2.

The foregoing terminal provided in this embodiment of this application can update the security policy file formulated by using a SELinux technology. In the update manner provided in this embodiment of this application, the terminal does not need to be restarted, and a service currently running on the terminal is not interrupted. In addition, after receiving the security policy file sent by the server, the terminal may automatically run the update method provided in this embodiment of this application in the background. In addition, because only the security policy file is updated and a process of refreshing a partition is omitted, an update speed of the security update process is large. Therefore, the updated security policy file can come into effect immediately and quickly.

An embodiment of this application further provides a computer readable storage medium. The computer readable storage medium stores an instruction, and when the instruction is run on a terminal, the terminal is enabled to perform the methods described in the foregoing method embodiments.

An embodiment of this application further provides a computer program product including an instruction. When the computer program product is run on a terminal, the terminal is enabled to perform the methods described in the foregoing method embodiments.

Methods or algorithm steps described with reference to content disclosed in this application may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (Erasable Programmable ROM, EPROM), an electrically erasable programmable read-only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the application specific integrated circuit (ASIC).

A person skilled in the art should be aware that in the foregoing one or more examples, functions described in this application may be implemented by hardware, software, firmware, or any combination thereof. When software is used for implementation, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A method, comprising:
   receiving, by a terminal, a security policy file sent by a server for a security enhanced Linux (SELinux) security policy; and
   performing, by the terminal in a power-on status, after receiving the security policy file:
      storing, by the terminal, the security policy file in preset storage space using at least one of a first service or process;
      reading, by the terminal, the security policy file from the preset storage space and writing the security policy file into a memory, wherein the reading the security policy file from the preset storage space and writing the security policy file into the memory comprises:
         modifying, by the terminal, a value of a preset attribute value from a first value to a second value by using the at least one of the first service or process;
         reading, by the terminal, in response to the terminal detecting that the value of the preset attribute value is changed from the first value to the second value, the security policy file from the preset storage space using at least one of a second service or process; and
         writing the security policy file into the memory; and
      loading, by the terminal, the security policy file in the memory using the at least one of the second service or process.

2. The method according to claim 1, further comprising:
   performing, by the terminal, before the reading, by the terminal, the security policy file from the preset storage space and writing the security policy file into a memory, at least one of a security or integrity check on the security policy file stored in the preset storage space.

3. The method according to claim 1, wherein, when the terminal is powered off, the value of the preset attribute value is changed from the second value to the first value; and
wherein the modifying the value of the preset attribute value from the first value to the second value by using the at least one of the first service or process comprises modifying, by the terminal, when the terminal is restarted, in a kernel startup stage, the value of the preset attribute value from the first value to the second value.

4. The method according to claim 3, wherein the at least one of the first service or process is an update_sepolicy service, wherein the at least one of the second service or process is an init process, and wherein the preset attribute value is an attribute value of a SELinux.reload_policy.

5. The method according to claim 3, wherein the preset storage space is a preset writable partition of the terminal.

6. A terminal, comprising:
a communications interface;
a bus;
a processor;
a first memory;
a second memory; and
a non-transitory computer readable memory storing program code for execution by the processor, the program including instructions to:
receive, through the communications interface, a security policy file sent by a server;
write the security policy file into the first memory using at least one of a first service or process while the terminal is in a power-on status;
modify a value of a preset attribute value from a first value to a second value using the at least one of the first service or process; and
perform, in response to detecting that the value of the preset attribute value is changed from the first value to the second value:
read the security policy file from the first memory by using at least one of a second service or process;
write the security policy file into the second memory; and
load the security policy file in the second memory using the at least one of the second service or process.

7. The terminal according to claim 6, wherein the program further includes instructions to perform at least one of a security or integrity check on the security policy file stored in the first memory.

8. The terminal according to claim 6, wherein when the terminal is powered off, the value of the preset attribute value is changed from the second value to the first value; and
wherein the program further includes instructions to, when the terminal is restarted, in a kernel startup stage, modify the value of the preset attribute value from the first value to the second value, to read the security policy file from the first memory and write the security policy file into the second memory after it is detected, in the at least one of the second service or process, that the value of the preset attribute value is modified from the first value to the second value.

9. The terminal according to claim 8, wherein the at least one of the first service or process is an update_sepolicy service, wherein the at least one of the second service or process is an init process, and wherein the preset attribute value is an attribute value of a SELinux.reload_policy.

10. The terminal according to claim 8, wherein the first memory is a preset writable partition of the terminal.

11. A method, comprising:
receiving, by a terminal, a security policy file sent by a server for a security enhanced Linux (SELinux) security policy; and
performing, by the terminal in a power-on status, after the receiving the security policy file:
storing, by the terminal, the security policy file in preset storage space by using at least one of a first preset service or process;
modifying, by the terminal, a value of a preset attribute using the at least one of the first service or process;
reading, by the terminal, the security policy file from the preset storage space in response to the terminal detecting that a value of the preset attribute value is modified;
writing the security policy file with the modified preset attribute value into a memory using at least one of at least one of a second preset service or process; and
loading, by the terminal, the security policy file with the modified preset attribute value in the memory by using the at least one of the second preset service or process.

12. The method according to claim 11, further comprising:
performing, by the terminal, before the reading the security policy file and the writing the security policy file, at least one of a security or integrity check on the security policy file stored in the preset storage space.

13. The method according to claim 11, wherein the at least one of the second preset service or process is an init process.

14. The method according to claim 12, wherein the preset storage space is a preset writable partition of the terminal.

* * * * *